Aug. 31, 1926.
H. S. GANO
1,597,783
FEED WATER TEMPERATURE REGULATOR
Filed July 11, 1924
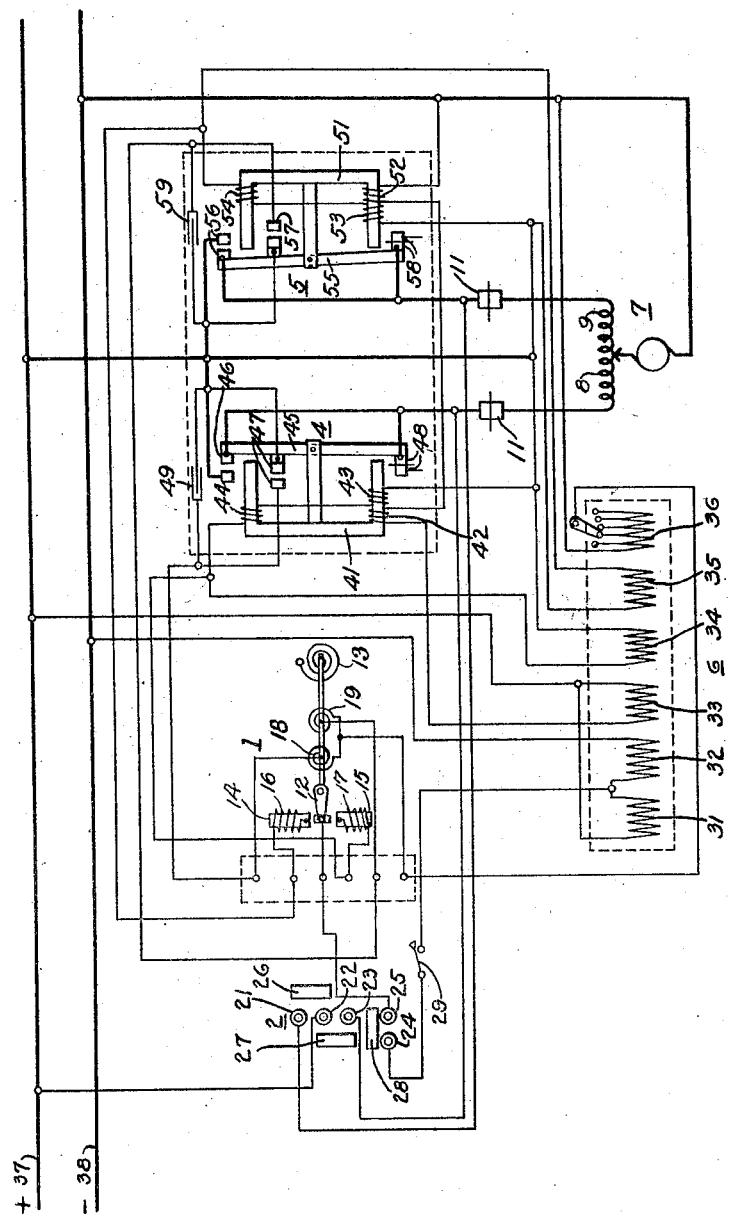
WITNESSES:
INVENTOR
Harlan S. Gano.
BY
ATTORNEY Patented Aug. 31, 1926.

1,597,783

UNITED STATES PATENT OFFICE.

HARLAN S. GANO, OF WILKINSBURG, PENNSYLVANIA, ASSIGNOR TO WESTINGHOUSE ELECTRIC & MANUFACTURING COMPANY, A CORPORATION OF PENNSYLVANIA.

FEED-WATER TEMPERATURE REGULATOR.

Application filed July 11, 1924. Serial No. 725,342.

My invention relates to feed water temperature regulators and particularly to thermal control systems therefor.

One object of my invention is to provide a thermal control system that shall be either manually controlled or automatic in its operation.

Another object of my invention is to provide a system of thermal control that shall operate to cause a motor to reverse its direction of rotation in accordance with temperature changes.

A further object of my invention is to provide a system of thermal control in which anti-hunting coils are actuated simultaneously with the operation of the relays that energize a control motor.

The accompanying drawing is a diagram of circuits and apparatus embodying my invention.

My invention comprises, in general, a thermostat 1 that is inserted in the body over which it is desired to exercise thermal control, such as a feed-water heater, a switch 2 for manually or automatically controlling the system, a pair of similar relays 4 and 5 that are controlled in accordance with the condition of the thermostat 1, a plurality of resistor units 6, a motor 7 having a divided field winding comprising sections 8 and 9, and a pair of limiting switches 11 for interrupting the motor circuit when it has traveled a predetermined amount. The motor 7 controls a source of thermal energy which may be a governor and valve supplying steam to a turbine, or it may be an electric furnace or a like device. While I have provided the present invention primarily as a thermal control system for a feed water unit, it is to be understood that the system may be employed for many other purposes.

The thermostat 1 comprises a pivoted contactor 12 whose position is controlled by a bimetallic strip 13 that is subjected to the temperature over which it is desired to exercise control, a pair of magnetizable contact members 14 and 15 around which are wound a relatively few turns of wire 16 and 17 whereby the contact members 14 and 15 become electromagnets when energized, and anti-hunting coils 18 and 19 that are mechanically connected to the contactor 12 and are of bimetallic thermo-responsive material. The particular construction of the thermostat 1 is described and claimed in my copending application, Serial No. 69,074, filed Nov. 14, 1925, and which is assigned to the Westinghouse Electric and Manufacturing Company.

Upon the completion of a circuit between either of the stationary contact members 14 and 15 and the contactor 12, the windings 16 and 17 energize the magnetizable members for holding the contactor 12 in engagement therewith until such engagement is broken by the action of the usual bimetallic actuating spring 13. The anti-hunting coils 18 and 19 are provided for generating additional thermal energy that acts upon the bimetallic element 13, whereby the contactor 12 is moved at a temperature slightly in advance of the actual temperature in the device under thermal control. By reason of the completion or breaking of the circuit slightly in advance of the predetermined temperature in the device under control, over-shooting or under-shooting of that temperature is prevented. The term "anti-hunting" is usually applied to such windings.

The control switch 2 comprises a plurality of stationary contact members 21 to 25, inclusive, movable contact members 26, 27 and 28 and a service switch 29 or a pilot switch on any external device, such as a circuit interrupter associated with the motor circuits, common to dual drive units. Movable contact members 26, 27 and 28 complete circuits between the pairs of stationary contact members 21—22, 22—23, and 24—25, respectively. The movable contact member 26 is for the purpose of manually causing the motor 7 to operate in order to raise the temperature of the device under control. The movable contact member 27 is provided for manually controlling the motor 7 to lower the temperature of the device under control, and the movable contact member 28 is for the purpose of providing automatic control of the motor 7 as hereinafter described.

The resistor 6 comprises a plurality of resistor elements 31 to 36, inclusive, any one or all of which may be made adjustable when desired. A supply circuit 37, 38 is provided for supplying energy to the system. The relays 4 and 5 are similar in structure and a description of one relay only will be sufficient. The relay 4 is provided with a frame 41 of E-shape.

The relays are provided with permanent holding coils 42 and 52 that are in series connection with each other and with resistor 33 across the supply circuit 37, 38. The resistor 33 and the coils 42, 52 are connected in parallel circuit with the resistors 31 and 32, which are connected in series circuit relation relatively to each other.

The relay 4 is also provided with a coil 43 disposed in juxtaposition to the permanently energized coil 42 on one of the arms of the frame 41 in such manner than the coil 42 may be neutralized by the coil 43 under conditions hereinafter described. The opposite arm of the frame 41 is provided with an actuating coil 44. A pivoted armature member 45 is carried by the frame 41 and disposed on the open side thereof. The armature 45 is provided with switches 46, 47 and 48. A condenser 49 is placed across the contacts of the switch 47.

Resistor 34 is connected in parallel relation to the coils 43 and 44 that are in series connection with each other and resistor 35 is similarly connected in parallel relation to the series connected coils 53 and 54. The resistors 34 and 35 serve to dissipate the inductive surge that takes place when the circuits comprising the associated coils are interrupted. Switches 48 and 58, as here shown, are not connected to any electrical apparatus, although they may be used for controlling a signal circuit or an auxiliary control circuit for a shunt wound motor when desired.

If it is desired to raise the temperature of the controlled device, the operator moves the movable contact member 26 into engagement with the stationary contact members 21 and 22 whereupon a circuit is completed from the positive conductor 37 through the switch 26, one of the limit switches 11, the field winding 9 of the motor 7 and the motor 7 to the negative conductor 38, whereupon the motor 7 is caused to rotate and effect an increase in the temperature of the body surrounding the thermostatic element 1. Rotation of the motor 7 continues until the operator releases the movable contact member 26 or until the operation of the motor 7 causes limit switch 11 to open.

In the event that it is desired to lower the temperature of the body influencing the thermostat 1, the operator closes the circuit between the movable contact member 27 and the stationary contact members 22 and 23, whereupon a circuit is completed from the positive conductor 37 through the stationary contact member 23, the movable contact member 27 and the stationary contact member 23 to one of the limit switches 11, the field winding 8 of the motor 7 and the motor 7 to the negative conductor 38, whereupon the motor is caused to rotate in an opposite direction until the operator releases the movable contact member 27 or until the limit switch 11 opens the motor circuit.

In the event that it is desired to render the control of the motor 7 automatic, the service switch 29 is closed and the movable contact member 28 is moved into engagement with the stationary contact members 24 and 25. Let it be assumed that the temperature of the control body is now too high and that it is desired to lower the temperature thereof. The thermostat, being above the predetermined temperature, will have caused the bimetallic spring 13 to move the contactor 12 into engagement with the stationary contact member 15. A circuit is thereupon completed from the positive conductor 37 through the series-connected coils 43 and 44 and the parallel-connected resistor 34, magnetic winding 17, about the stationary contact member 15, the stationary contact member 15, contactor 12, the automatic controlling switch 2, service switch 29, and resistor 32 to the negative conductor 38. The completion of this circuit permits the coil 43 to oppose and overcome the holding action of the permanently energized coil 42, whereupon the coil 44 sets up a magnetic flux which attracts the armature member 45 in a counter-clockwise direction and switches 46 and 47 are closed.

Upon the closing of switch 46, a circuit is completed from the positive conductor 37 through the switch 46, one of the limiting switches 11, field winding 8 of the motor 7, and the motor 7 to the negative conductor 38. The motor thereupon rotates in such direction that a smaller amount of thermal energy is delivered to the member under control. The closing of switch 47 completes a circuit from the positive conductor 37 through the switch 47, anti-hunting coil 18, and resistor 36 to the negative conductor 38. The anti-hunting coil 18 being energized, the additional thermal energy is transmitted to the bimetallic spring 13.

The continued energization of the bimetallic spring 13 by the regulated device together with the magnetic action of the winding 17 of the stationary contact member 15, opposes the action of the anti-hunting coil 18 in biasing the contactor 12 away from the stationary contact member 15. The action of the anti-hunting coil 18 finally overcomes the combined action of the decreasingly-energized bimetallic member 13 and holding coil 17 as the temperature of the regulated device approaches normal and the contactor 12 moves away from the stationary contact member 15, whereupon the circuit is broken.

As has been previously pointed out, the purpose of the anti-hunting coil 18 is to cause the de-energization of the circuit a short time before the occurrence of a desired temperature in the protected circuit. It is a well known fact that the temperature of any such device has a definite time lag between the occurrence of a definite temperature value and the operation of a connected relay system. The function of the anti-hunting coil is to counteract this time lag.

Upon the interruption of the circuit between the contactor 12 and the stationary contact member 15, the coils 43 and 44 become de-energized, thereby permitting the permanently energized coil 42 to attract the armature 45 in a clockwise direction. Movement of the armature 45 opens the switches 46 and 47. Opening of the switch 46 de-energizes the motor 7 and the opening of the switch 47 de-energizes the anti-hunting coil 18. Sparking between the contactor 12 and the stationary contact member 15 is prevented by reason of the fact that the resistor 34 is connected in parallel relation to coils 43 and 44. This connection permits the inductive currents normally set up upon the opening of any such circuit to be dissipated in the resistors rather than by sparking at the contact points. Sparking across the terminals of the switch 47 is similarly prevented by reason of the condenser 49.

The system is now in an inactive condition, switches 46, 47, 56 and 57 being held in their open positions by the permanently energized holding coils 42 and 52.

Assuming that the temperature of the bimetallic spring 13 has now dropped sufficiently to indicate that an additional thermal energy is needed by the protected device, the circuit will be completed between the contactor 12 and the stationary contact member 14, whereupon the coil 16 is energized and the contactor held in magnetic engagement with the stationary contact member 14. A circuit is thereupon completed that extends from the positive conductor 37 through the series-connected coils 53 and 54 and the parallel-connected resistor 35, the coil 16, stationary contact member 14, contactor 12, the movable contact member 28 of the control switch 2, the service switch 29, and resistor 32 to the negative conductor 38.

The coil 52 is thereupon neutralized by the effect of coil 53 and coil 54 turns the armature 55 in a clockwise direction closing switches 56 and 57. The closing of the switch 56 completes a circuit from the positive conductor 37 through the switch 56, the winding 9 of the motor 7, and the motor 7 to the negative conductor 38, whereupon the motor is caused to rotate in such direction as to permit of a greater supply of thermal energy being furnished to the device under control. The closing of switch 57 completes a circuit from the positive conductor 37 through the switch 57, the anti-hunting coil 19 and the resistor 36 to the negative conductor 38, whereupon the anti-hunting coil 19 tends to overcome the force of the bimetallic strip 13 and cause the contactor 12 to overcome the magnetic force of the coil 16 and the stationary contact member 14 thereby opening the circuit of the coil 16.

The interruption of this circuit by the disengagement of the contactor 12 and the stationary contact member 14 de-energizes the coils 53 and 54 and their inductive energy is dissipated in the parallel connected resistor 35. The permanent holding coil thereupon turns the armature 55 in a counter-clockwise direction and opens the switches 56 and 57. Opening of the switch 56 results in the de-energization of the motor 7 and the opening of the switch 57 results in the de-energization of the anti-hunting coil 19. Sparking at the switch 57 is prevented by the condenser 59. The system is again in the state of equilibrium and the next operation thereof will depend upon the position assumed by the contactor 12 with relation to the stationary contact members 14 and 15. The foregoing cycle of operations may be completed an indefinite number of times without the attendance of an operator.

It is to be observed that overrunning of the motor 7 in either direction is prevented by the limit switches 11. The electromagnets comprising the stationary contact members 14, 15 and the windings 16, 17, respectively, are de-energized only when the thermostatic spring 18 and 19 become sufficiently energized to overcome the forces of these electromagnets together with the bimetallic spring 13 acting on the contactor 12. Also the thermal energy generated by the several coils in the system is always dissipated in a resistor or a condenser in such manner that pitting of the contacts is prevented.

Accordingly, I have devised a system of thermal control that is entirely automatic in its operation or that may be manually controlled, as desired. The system is particularly adapted for controlling a motor, which, in turn, regulates the input of thermal energy into a device to be protected in accordance with the temperature of that device.

I do not wish to be restricted to the specific circuit connections or arrangements of parts herein set forth, as various modifications thereof may be effected without departing from the spirit and scope of my invention. I desire, therefore, that only such limitations shall be imposed as are indicated in the appended claims.

I claim as my invention:—

1. In a thermostatic control system, a pair of stationary contact members, a solenoid associated with each stationary contact member for constituting an electromagnet, a thermally actuated contactor for selectively completing a circuit with one or the other of the contact members, means energized upon the completion of a circuit between the thermally actuated contactor with one or the other of said stationary contact members, and thermally responsive means actuated in accordance with the current flowing in said circuit for disengaging said thermally actuated contact member from one or the other of said stationary contact members.

2. In a system of thermal control, a thermostat for selectively completing one of a plurality of circuits, a relay comprising a plurality of windings in each circuit, a motor common to all of the circuits for controlling a source of thermal energy, a field winding for the motor, sections of which constitute portions of the several circuits, and an anti-hunting coil associated with each of the circuit completing positions of the thermostat whereby upon the completion of each circuit by the thermostat and the operation of the motor, the anti-hunting coil associated therewith is energized and tends to interrupt the circuit.

3. In an automatic system of thermal control, a plurality of relays, each comprising means for normally holding it in one position, a motor for controlling a source of thermal energy, a field winding therefor comprising a plurality of sections, a thermostat for selectively completing one of a plurality of circuits in accordance with the condition of the source of thermal energy, and anti-hunting coils therefor, the completion of any circuit neutralizing the holding means of one of the relays thereby causing it to be moved to a second position whereupon one of the sections of the field winding is energized and the motor is caused to rotate in a given direction, and the associated anti-hunting coil is also energized.

4. In an automatic system of thermal control, a plurality of relays, a motor for controlling a source of thermal energy, a field winding therefor comprising a plurality of sections, a thermostat, for selectively completing one of a plurality of circuits in accordance with the condition of the source of thermal energy, and anti-hunting coils therefor, the completion of any circuit causing one of the relays to move to an advanced position whereupon one of the sections of the field winding is energized and the motor is caused to rotate in a given direction, and the associated anti-hunting coil is also energized.

5. In an automatic system of thermal control, a plurality of relays, a motor for controlling a source of thermal energy, a field winding therefor comprising a plurality of sections, a thermostat for selectively completing one of a plurality of circuits in accordance with the condition of the source of thermal energy, and anti-hunting coils therefor, the completion of any circuit causing one of the relays to operate whereupon one of the sections of the field winding is energized and the motor is caused to rotate in a given direction, and the associated anti-hunting coil is also energized.

6. In an automatic system of thermal control, a plurality of relays, a motor for controlling a source of thermal energy, a field winding therefor comprising a plurality of sections, a thermostat for selectively completing one of a plurality of circuits in accordance with the condition of the source of thermal energy, and anti-hunting coils therefor, the completion of any circuit causing one of the relays to operate whereupon one of the sections of the field winding is energized and the motor is caused to rotate in a given direction, the associated anti-hunting coil is also energized, and, upon the movement of the thermostat to another position, the first circuit is interrupted, a second section of the field winding energized, the motor rotated in the opposite direction and another anti-hunting coil energized.

7. In an automatic system of thermal control, a plurality of relays, a motor for controlling a source of thermal energy, a field winding therefor comprising a plurality of sections, a thermostat for selectively completing one of a pluraltiy of circuits in accordance with the condition of the source of thermal energy, and anti-hunting coils therefor, the completion of any circuit causing one of the relays to operate whereupon one of the sections of the field winding is energized and the motor is caused to rotate in a given direction, the associated anti-hunting coil is also energized, and, upon the movement of the thermostat to another position, the first circuit is interrupted, a second section of the field winding energized, the motor rotated in the opposite direction and another anti-hunting coil energized, the energization of the anti-hunting coils causing the thermostat to change the circuits slightly in advance of the attainment of predetermined temperatures in the source of thermal energy.

8. In a system of thermal control, a thermostat for selectively completing one of a plurality of circuits, a relay in each circuit, a motor common to all the circuits for controlling a source of thermal energy in accordance with the circuits completed by said thermostat, and anti-hunting means associated with each of the circuits completed and actuated in accordance with the current flowing in the circuit completed for breaking the circuit completed by said thermostat.

9. In a system of thermal control, a motor, a source of thermal energy controlled in accordance with the direction of rotation of said motor, a plurality of relays for determining the direction of rotation of said motor, thermally responsive means for energizing said relays in accordance with the condition of said thermal energy, and means responsive to the current flowing in the relays for deenergizing said relays.

10. In a system of thermal control, a motor, a source of thermal energy controlled in accordance with the direction of rotation of said motor, a plurality of relays for determining the direction of rotation of said motor, thermally responsive means for energizing said relays in accordance with the condition of said thermal energy, and means responsive to the current flowing in the relays for intermittently deenergizing said relays.

11. In a system of thermal control, a motor, a source of thermal energy controlled by said motor in accordance with the direction of rotation thereof, a pair of relays selectively energized for determining the direction of rotation of said motor, thermally responsive means for selectively energizing said relays in accordance with the condition of said thermal energy, and means for deenergizing said relays in accordance with the current flowing therein.

In testimony whereof, I have hereunto subscribed my name this 26th day of June 1924.

HARLAN S. GANO.